US008533812B1

(12) United States Patent
Gabriel (10) Patent No.: US 8,533,812 B1
(45) Date of Patent: Sep. 10, 2013

(54) SYSTEMS AND METHODS FOR SECURING ACCESS TO KERNEL DEVICES

(75) Inventor: Basil Gabriel, Downey, CA (US)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 13/040,258

(22) Filed: Mar. 3, 2011

(51) Int. Cl.
*G06F 21/00* (2006.01)

(52) U.S. Cl.
USPC ............ 726/17; 726/1; 726/2; 726/4; 726/16; 726/21; 726/26; 726/27; 726/28; 726/29; 726/30; 713/168; 713/170; 713/182; 719/321; 719/322; 719/323; 719/324; 719/325; 719/326

(58) Field of Classification Search
USPC .................. 726/1–21, 26–30; 713/168–186; 719/321–327
See application file for complete search history.

(56) References Cited

U.S. PATENT DOCUMENTS

| | | | | |
|---|---|---|---|---|
| 6,212,574 B1 * | 4/2001 | O'Rourke et al. | ............ | 719/321 |
| 6,871,350 B2 * | 3/2005 | Wong et al. | .................. | 719/323 |
| 7,024,672 B2 * | 4/2006 | Callender et al. | ............. | 719/321 |
| 7,237,257 B1 * | 6/2007 | Hirsh | ............................. | 726/10 |
| 2002/0176575 A1 * | 11/2002 | Qawami et al. | ............... | 380/201 |
| 2005/0210479 A1 * | 9/2005 | Andjelic | ........................ | 719/321 |
| 2005/0216938 A1 * | 9/2005 | Brady et al. | .................... | 725/76 |
| 2009/0241170 A1 * | 9/2009 | Kumar et al. | ..................... | 726/3 |

OTHER PUBLICATIONS

Creating User-Mode Device Drivers with a Proxy by Galen C. Hunt; Publisher: USENIX; Year: 1997.*
User-Mode Interactions: Guidelines for Kernel-Mode Drivers by Microsoft; Publisher: Microsoft; Date: Jul. 10, 2006.*
Windows; Windows Security Model: What Every Driver Writer Needs to Know; http://www.microsoft.com/whdc/driver/security/drvsecure.mspx; Jul. 7, 2004.

* cited by examiner

*Primary Examiner* — Madhuri Herzog
(74) *Attorney, Agent, or Firm* — ALG Intellectual Property, LLC (57) ABSTRACT

A computer-implemented method for securing access to kernel devices may include (1) identifying a context proxy privileged to access a secure device interface for a device, (2) receiving a request from the context proxy to allow a user-mode process to access a non-secure device interface for the device, (3) receiving a request from the user-mode process to access the non-secure device interface, and then (4) allowing the user-mode process to access the non-secure device interface directly based on the request from the context proxy. Various other methods and systems are also disclosed.

20 Claims, 7 Drawing Sheets

SYSTEMS AND METHODS FOR SECURING ACCESS TO KERNEL DEVICES

BACKGROUND

Many modern operating systems distinguish between processes executing in kernel mode and processes executing in user mode. Kernel-mode processes (such as device drivers) may generally execute arbitrary instructions and perform arbitrary operations on devices. User-mode processes (such as applications), on the other hand, may be limited to a subset of functionality. The division between kernel-mode processes and user-mode processes may protect a computing system from errors in user-mode applications causing system-wide faults or malicious applications inappropriately using system resources.

An operating system may secure a device such that the device is only accessible from certain process contexts. A context proxy operating within such a process context may then allow trusted user-mode applications to access the secured device indirectly by communicating with the secured device on behalf of the trusted user-mode applications. Unfortunately, requiring all communications from a user-mode application to the device to first pass through the context proxy may degrade the performance of the user-mode application and may also introduce another failure point in interactions with the device. Alternatively, an operating system could allow any application to communicate with a device from any context. Unfortunately, the device would then be vulnerable to untrustworthy applications. Accordingly, the instant disclosure identifies a need for additional systems and methods for securing access to kernel devices.

SUMMARY

As will be described in greater detail below, the instant disclosure generally relates to systems and methods for securing access to kernel devices by authenticating user-mode processes through a context proxy and allowing the user-mode processes to access a user-mode interface for the device based on the authentication. In some examples, the systems described herein may accomplish such a task by (1) identifying a context proxy privileged to access a secure device interface for a device, (2) receiving a request from the context proxy to allow a user-mode process to access a non-secure device interface for the device, (3) receiving a request from the user-mode process to access the non-secure device interface, and then (4) allowing the user-mode process to access the non-secure device interface directly based on the request from the context proxy.

A device driver may interface with both the secure device interface and the non-secure device interface. In some examples, the systems described herein may receive the request from the context proxy via the secure device. These systems may further authenticate the user-mode process. For example, these systems may add an identifier of the user-mode process to a list of authenticated processes in response to the request from the context proxy. In some examples, these systems may later determine that the user-mode process has terminated and then remove the identifier of the user-mode process from the list of authenticated processes. Upon receiving the request from the user-mode process, in some examples the systems described herein may determine that the list of authenticated processes includes the identifier of the user-mode process.

In some examples, the non-secure device interface may include a non-secure device file. In these examples, the systems described herein may allow the user-mode process to access the non-secure device interface directly by allowing the user-mode process to open the non-secure device file. If a list of authenticated processes is used to determine access to the non-secure device interface, the systems described herein may allow the user-mode process to access the non-secure device interface based on the determination that the list of authenticated processes includes an identifier of the user-mode process.

In some additional examples, systems described herein may (1) identify a context proxy privileged to access a secure device, (2) send a request to the context proxy for access to a non-secure device interface for the device, and then (3) access the device directly via the non-secure interface. A device driver may interface with both the secure device interface and the non-secure device interface. In some examples, the non-secure device interface may include a non-secure device file. In these examples, accessing the device directly may entail opening the non-secure device file. In some examples, the systems described herein may send the request to the context proxy by sending a secured communication.

As will be explained in greater detail below, by using a context proxy to authenticate user-mode processes for permission to use a non-secure device interface (instead of, e.g., using the context proxy for every communication between the user-mode processes and an underlying device), the systems and methods described herein may allow trusted user-mode processes to safely access a device while reducing the avoidable overhead of including the context proxy in every transaction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
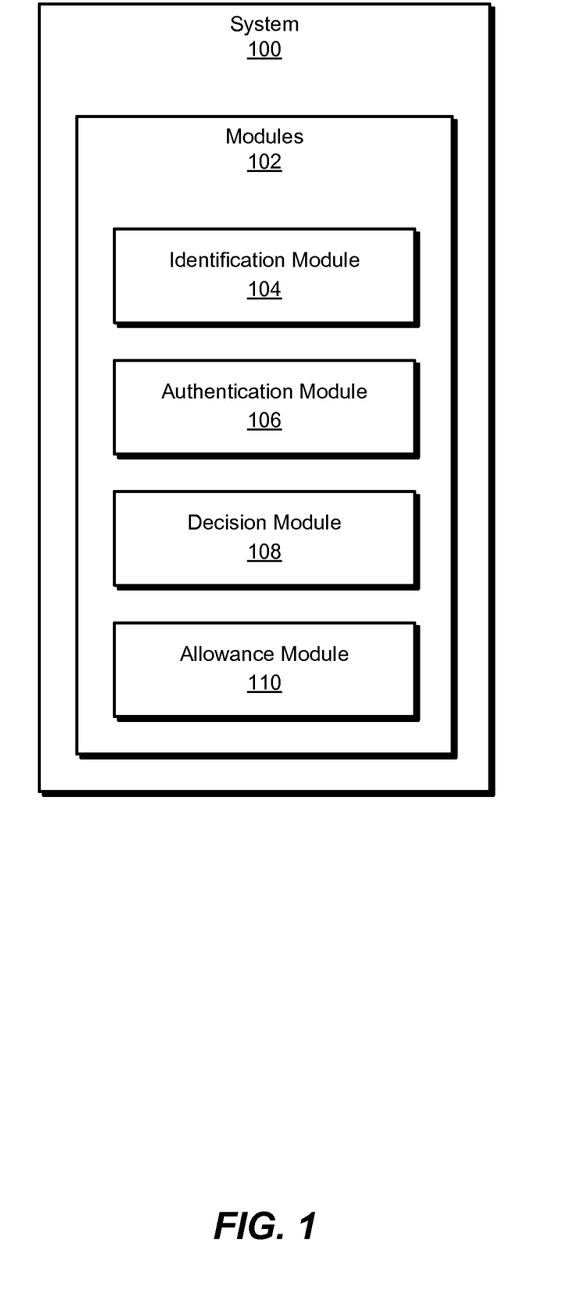
FIG. 1 is a block diagram of an exemplary system for securing access to kernel devices.
Figure 2:
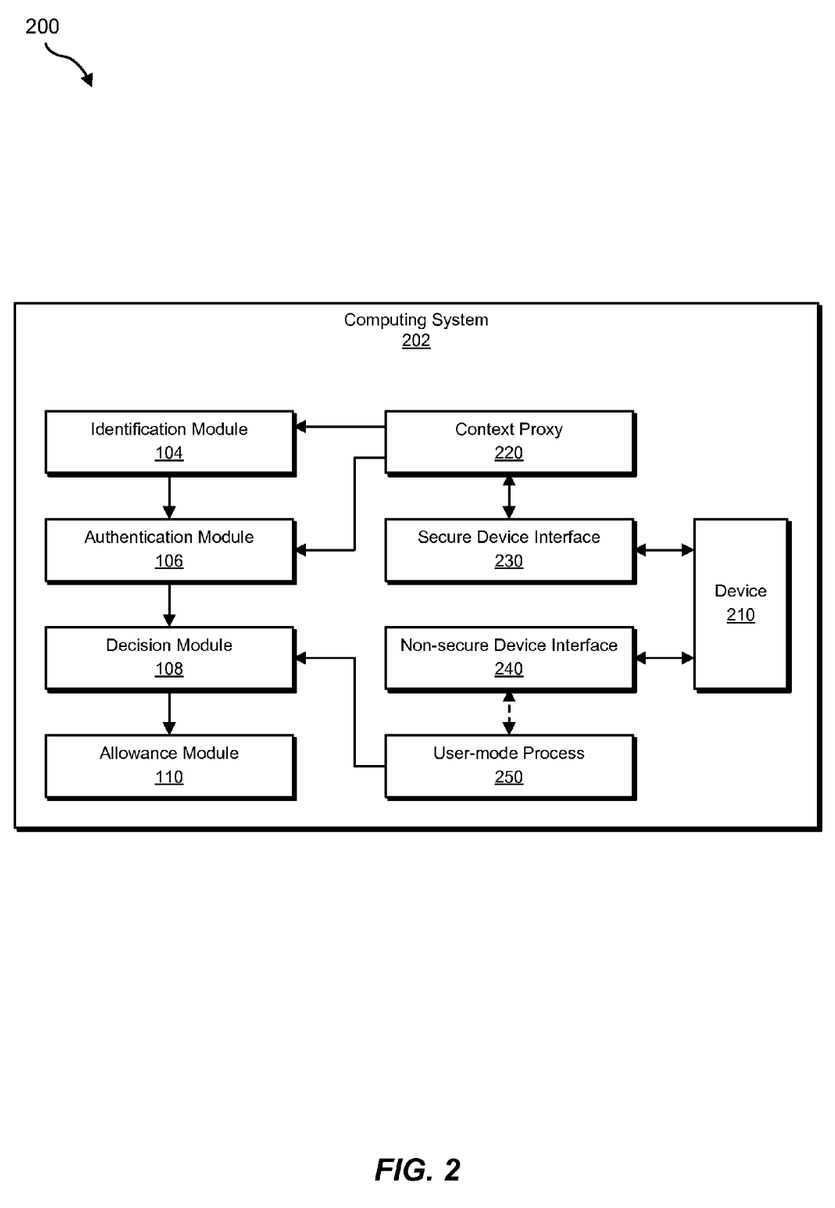
FIG. 2 is a block diagram of an exemplary system for securing access to kernel devices.
Figure 3:
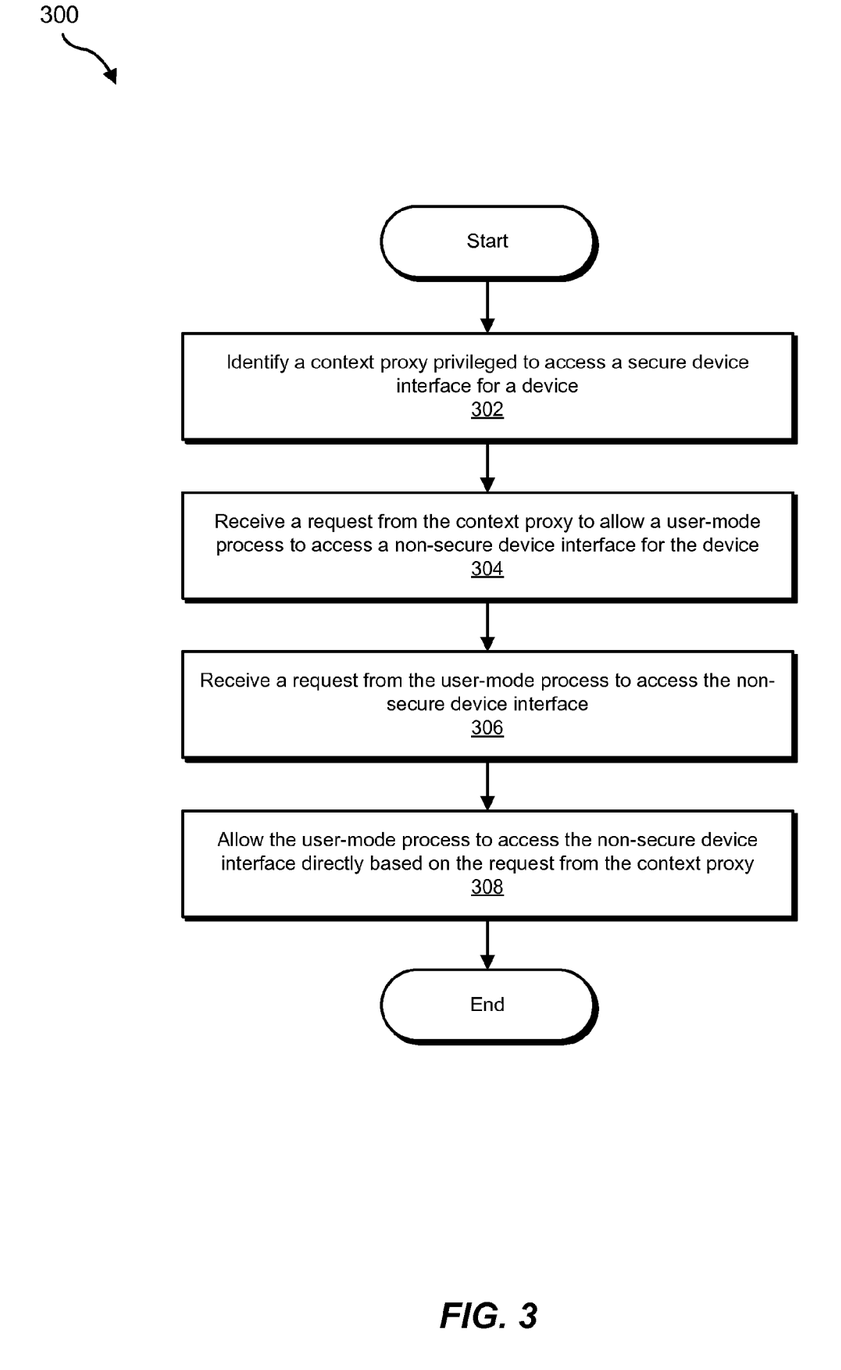
FIG. 3 is a flow diagram of an exemplary method for securing access to kernel devices.
Figure 4:
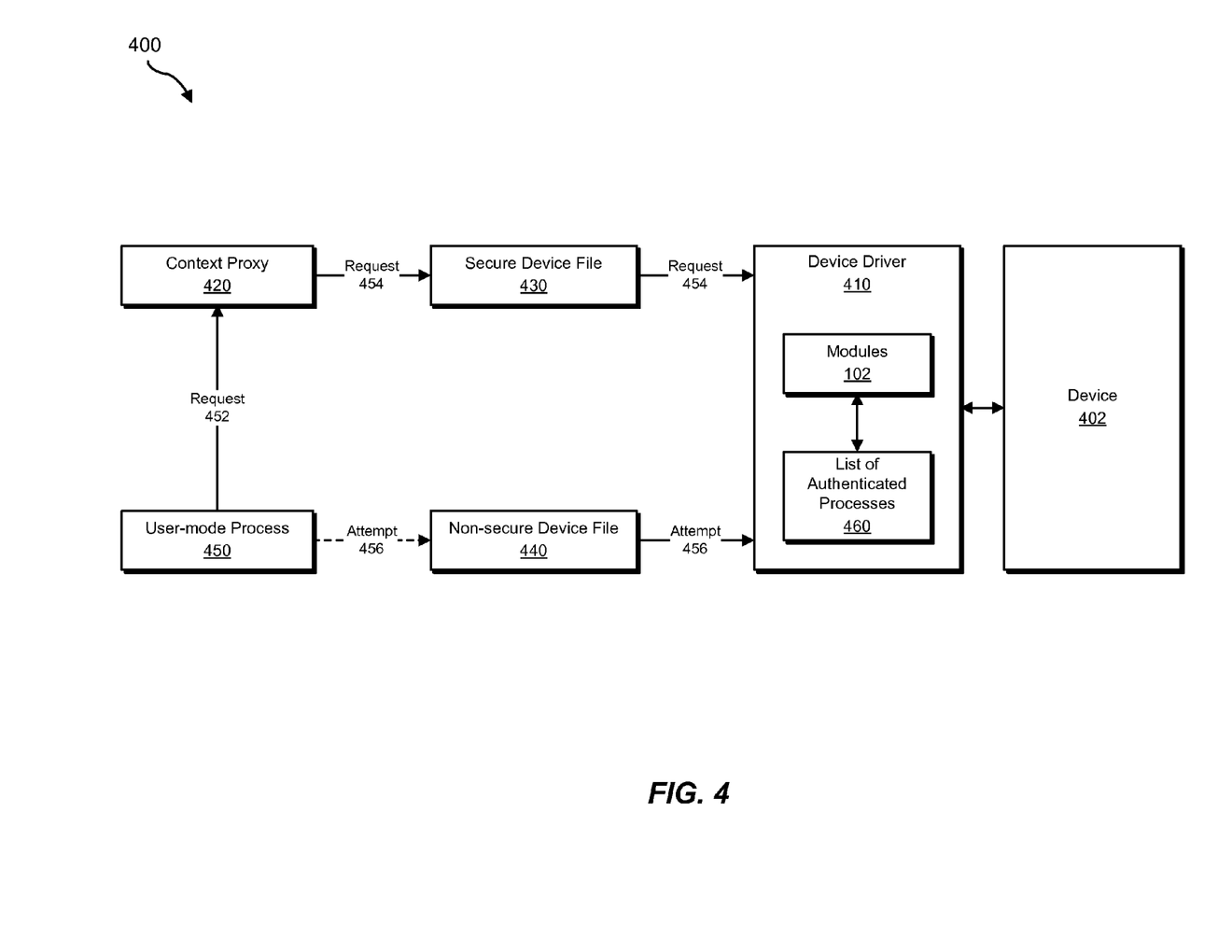
FIG. 4 is a block diagram of an exemplary system for securing access to kernel devices.

The following will provide, with reference to FIGS. 1, 2, and 4, detailed descriptions of exemplary systems for securing access to kernel devices. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for securing access to kernel devices. As illustrated in this figure, exemplary system 100 may include one or more modules 102 for performing one or more tasks. For example, and as will be explained in greater detail below, exemplary system 100 may include an identification module 104 programmed to identify a context proxy privileged to access a secure device interface for a device. Exemplary system 100 may also include an authentication module 106 programmed to receive a request from the context proxy to allow a user-mode process to access a non-secure device interface for the device. Exemplary system 100 may additionally include a decision module 108 programmed to receive a request from the user-mode process to access the non-secure device interface.

In addition, and as will be described in greater detail below, exemplary system 100 may include an allowance module 110 programmed to allow the user-mode process to access the non-secure device interface directly based on the request from the context proxy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 including a device 210. In one embodiment, and as will be described in greater detail below, one or more of modules 102 from FIG. 1 may program computing system 202 to provide secured access to device 210 by (1) identifying a context proxy (e.g., a context proxy 220) privileged to access a secure device interface (e.g., a secure device interface 230) for a device (e.g., device 210), (2) receiving a request from the context proxy to allow a user-mode process (e.g., user-mode process 250) to access a non-secure device interface (e.g., a non-secure device interface 240) for the device, (3) receiving a request from the user-mode process to access the non-secure device interface (e.g., receiving a request from user-mode process 250 to access non-secure device interface 240), and then (4) allowing the user-mode process to access the non-secure device interface directly based on the request from the context proxy (e.g., allowing user-mode process 250 to access non-secure device interface 240).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Device 210 generally represents any type or form of computing device that may be interfaced with using a device driver. In some examples, device 210 may represent a hardware device, such as a storage device, network card, video adapter, printer, mouse, keyboard, sound card, digital camera, bus, USB port, etc. Additionally or alternatively, device 210 may represent a software-implemented device configured to provide an abstract interface to hardware resources.

FIG. 3 is a flow diagram of an exemplary computer-implemented method 300 for securing access to kernel devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a context proxy privileged to access a secure device interface for a device. For example, at step 302 identification module 104 may, as part of computing system 202 in FIG. 2, identify context proxy 220 privileged to access secure device interface 230 for device 210.

As used herein, the phrase "context proxy" may refer to any proxy and/or gateway that may act on behalf of a process to perform functions that the process may not perform on its own. For example, a context proxy may include a process operating under a process context with privileges that other processes may lack. In some examples, the context proxy may execute in a kernel mode. Additionally or alternatively, the context proxy may execute in an inner protection ring. In some examples, the context proxy may be configured to authenticate the process context of any process that attempts to use the context proxy. Accordingly, the context proxy may be configured to authenticate non-privileged (e.g., user-mode) processes and relay system calls from the processes to the device via the secure device interface. In some examples, the context proxy may include SYMANTEC SERVICE FRAMEWORK (e.g., ccSvcHst.exe).

As used herein, the phrase "device interface" may refer to an interface for communicating with a device. In various examples, a device interface may be created by a device driver, exposed by a device driver, and/or operate via a device driver. In some examples, a device interface may include a device file (e.g., a device interface which appears as a file and/or allows many of the same input/output interactions as files). As used herein, the phrase "secure device interface" may refer to a device interface which only privileged processes may access. For example, a secure device interface may only allow access to processes from certain process contexts.

Identification module 104 may identify the context proxy in any suitable manner. In some examples, identification module 104 may operate as part of a device driver and identify the context proxy by receiving a communication from the context proxy.

FIG. 4 illustrates an exemplary system 400 for securing access to kernel devices. As shown in FIG. 4, a device 402 may interface with a device driver 410. Using FIG. 4 as an example, identification module 104 may, as part of device driver 410, identify a context proxy 420 privileged to access a secure device file 430 for device 402.

Returning to FIG. 3, at step 304 one or more of the systems described herein may receive a request from the context proxy to allow a user-mode process to access a non-secure device interface for the device. For example, at step 304 authentication module 106 may, as part of computing system 202 in FIG. 2, receive a request from context proxy 220 to allow user-mode process 250 to access non-secure device interface 240 for device 210. Using FIG. 4 as an additional example, at step 304 authentication module 106 may, as part of device driver 410, receive a request 454 from context proxy 420 to allow a user-mode process 450 to access a non-secure device file 440.

As used herein, the term "user-mode" may refer to any mode, context, and/or condition of restricted access, functionality, and/or authority. For example, a user-mode process may be unable to perform system calls on kernel-mode devices directly (e.g., without a proxy). In some examples, the term "user-mode" may refer to a lower relative access level (e.g., a protection ring outside the protection ring of a device driver with which a user-mode process wishes to interact).

As used herein, the phrase "non-secure device interface" may refer to a device interface which user-mode processes may access. For example, a non-secure device interface may only allow access to processes from arbitrary process contexts. However, as will be described in greater detail below, a device driver may still restrict access to the non-secure device interface based on an authentication process (e.g., requiring the context proxy to vouch for a user-mode process before allowing the user-mode process to use the non-secure device interface). In some examples, the non-secure device interface may include a non-secure device file (e.g., a device file accessible from any process context, including that of a user-mode process, but which may not open for a user-mode process without authentication for the user-mode process).

In some examples, one or more of the systems described herein may create the non-secure device interface. For example, authentication module 106 may create the non-secure device interface as an alternative to the secure device interface in response to the request from the context proxy. In these examples, a single device driver may interface with both the secure device interface and the non-secure device interface. Using FIG. 4 as an example, device driver 410 may interface with secure device file 430 and non-secure device file 440. In some examples, the non-secure device interface may replicate the functionality of the secure device.

The request from the context proxy may come in any suitable form. For example, the request may include a system call, such as an input/output control ("IOCTL"). As will be described in greater detail below, the context proxy may send the request in response to receiving a request from a user-mode process for permission to use the non-secure device interface. In some examples, authentication module 106 may receive the request via the secure device interface. Using FIG. 4 as an example, user-mode process 450 may send a request 452 to context proxy 420. Context proxy 420 may trust user-mode process 450 and therefore send request 454 to device driver 410 via secure device file 430.

Upon receiving the request from the context proxy, authentication module 106 may authenticate the user-mode process for use of the non-secure device interface. For example, authentication module 106 may add an identifier of the user-mode process to a list of authenticated processes in response to the request from the context proxy. The identifier may include any suitable information capable of identifying whether a user-mode process is authenticated for use of the non-secure device interface. For example, the identifier may include a process identifier (e.g., a number capable of uniquely identifying a process among all current processes). Using FIG. 4 as an example, authentication module 106 may added a process identifier of user-mode process 450 to a list of authenticated processes 460 in response to receiving request 454 from context proxy 420. In some examples, authentication module 106 may also keep the list of authenticated processes up-to-date. For example, authentication module 106 may determine that the user-mode process has terminated and then remove the identifier of the user-mode process from the list of authenticated processes.

Returning to FIG. 3, at step 306 one or more of the systems described herein may receive a request from the user-mode process to access the non-secure device interface. For example, at step 306 decision module 108 may, as part of computing system 202 in FIG. 2, receive a request from user-mode process 250 to access non-secure device interface 240 for device 210. Using FIG. 4 as an additional example, at step 306 decision module 108 may, as part of device driver 410, receive a request (e.g., in the form of an attempt 456) from user-mode process 450 to access (e.g., open) non-secure device file 440.

Decision module 108 may receive the request from the user-mode process in a variety of contexts. For example, the request may include a system call from the user-mode process to the device via the non-secure device interface. As mentioned earlier, in some examples the non-secure device interface may include a non-secure device file. In these examples, decision module 108 may receive a request from the user-mode process to open the non-secure device file.

Decision module 108 may also determine whether to fulfill the request to allow the user-mode process to access the non-secure device interface. For example, as mentioned earlier, authentication module 106 may have added an identifier of the user-mode process to a list of authenticated processes. Decision module 108 may then determine that the list of authenticated processes includes the identifier of the user-mode process in response to the request from the user-mode process. Using FIG. 4 as an example, decision module 108 may identify an attempt 456 by user-mode process 450 to open non-secure device file 440. Decision module 108 may then determine that list of authenticated processes 460 includes an identifier for user-mode process 450.

Returning to FIG. 3, at step 308 one or more of the systems described herein may allow the user-mode process to access the non-secure device interface directly based on the request from the context proxy. For example, at step 308 allowance module 110 may, as part of computing system 202 in FIG. 2, allow user-mode process 250 to access non-secure device interface 240 directly based on the request from context proxy 220. Using FIG. 4 as an additional example, at step 308 allowance module 110 may, as part of device driver 410, allow user-mode process 450 to access (e.g., open) non-secure device file 440 directly based on request 454 from context proxy 420.

As mentioned earlier, in some examples the non-secure device interface may include a non-secure device file. In these examples, allowance module 110 may allow the user-mode process to open the non-secure device file. For example, allowance module 110 may, as part of a MICROSOFT WINDOWS device driver, respond to an IRP_MJ_CREATE request by delivering a handle to the non-secure device file to the user-mode process. Had the user-mode process not been authenticated via the context proxy, the attempt to open the non-secure device file may have instead resulted in an error. Since the non-secure device file may be generally available from any process context, by allowing the user-mode process to open the non-secure device file the user-mode process may thereafter interact with the device directly via the non-secure device file without requiring an intervening proxy.

As mentioned earlier, in some examples the systems described herein may use a list of authenticated processes to determine which processes may access the non-secure device interface. Accordingly, in these examples allowance module 110 may allow the user-mode process to access the non-secure device interface based on the determination that an identifier of the user-mode process is present on the list of authenticated processes. Using FIG. 4 as an example, device driver 410 may respond to attempt 456 by allowing user-mode process 450 to open non-secure device file 440 because an identifier for user-mode process 450 is present in the list of authenticated processes 460.

If another user-mode process which had not gained an entry on the list of authenticated processes (e.g., via a request through the context proxy) attempted to open the non-secure device file, device driver may refuse the request to open the non-secure device file. Therefore, even though any user-mode process have an adequate process context from which to access the non-secure device file according to a protection mode scheme of the underlying operating system, the authentication list may effectively filter user-mode processes so that only user-mode processes trusted by the context proxy may access the non-secure device file. However, the user-mode process may only need to communicate via the context proxy one time (for authentication purposes), rather than for each interaction with the device. After step 308, method 300 may terminate.

Figure 5:
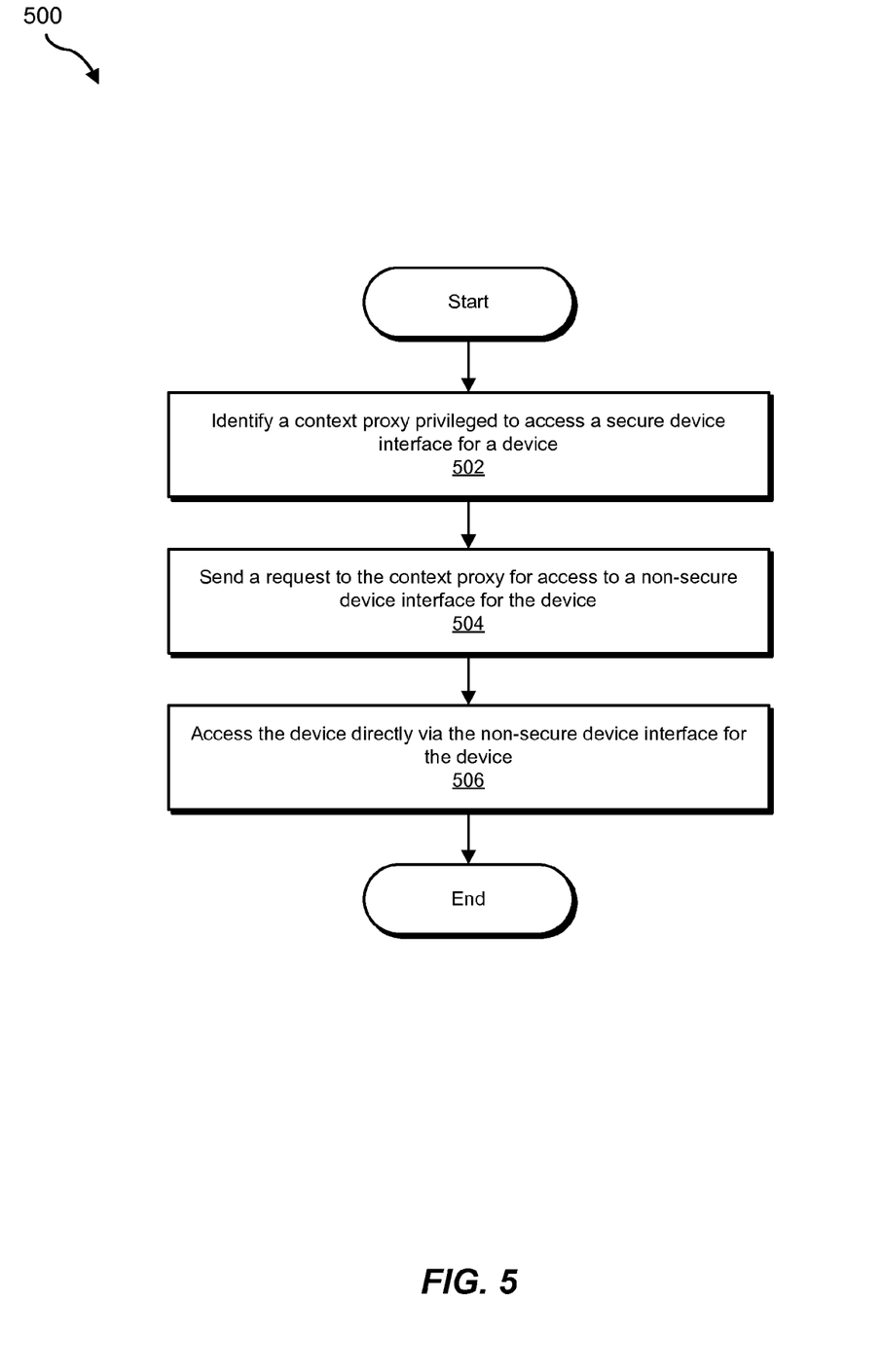
FIG. 5 is a flow diagram of an exemplary method for securing access to kernel devices.

FIG. 5 is a flow diagram of an exemplary computer-implemented method 500 for securing access to kernel devices. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2. For example, the steps shown in FIG. 5 may be performed by user-mode process 250 in FIG. 2, At step 502, one or more of the systems described herein may identify a context proxy privileged to access a secure device interface for a device. For example, user-mode process 250 in FIG. 2 may identify context proxy 220. Using FIG. 4 as another example, user-mode process 450 may identify context proxy 420.

At step 504, one or more of the systems described herein may send a request to the context proxy for access to a non-secure device interface for the device. For example, user-mode process 250 in FIG. 2 may send a request to context proxy 220 for access to non-secure device interface 240 for device 210. Using FIG. 4 as another example, user-mode process 250 may send request 452 to context proxy 420 for access to non-secure device interface 440 for device 402.

In some examples, the non-secure device interface may include a non-secure device file (e.g., a device file accessible from any process context, but which may not open for a user-mode process without authentication for the user-mode process).

In some examples, a single device driver may interface with both the secure device interface and the non-secure device interface. Using FIG. 4 as an example, device driver 410 may interface with secure device file 430 and non-secure device file 440. In some examples, the non-secure device interface may replicate the functionality of the secure device.

The user-mode process may send the request to the context proxy in any suitable manner. In some examples, the user-mode process may send a secured communication to the context proxy. For example, the user-mode process may use an authentication mechanism to communicate with the context proxy. Additionally or alternatively, the user-mode process may obfuscate the communication to make interference with the communication more difficult.

At step 506, one or more of the systems described herein may access the device directly via the non-secure device interface for the device. For example, user-mode process 250 in FIG. 2 may access device 210 directly via non-secure device interface 240 (e.g., rather than accessing device 210 through context proxy 220 via secure device interface 230). Using FIG. 4 as another example, user-mode process 450 may access device 402 directly via non-secure device file 440 (e.g., rather than accessing device 402 through context proxy via secure device file 430).

As mentioned earlier, in some examples the non-secure device interface may include a non-secure device file. In these examples, the user-mode process may access the device directly by opening the non-secure device file. After step 506, method 500 may terminate.

As detailed above, by using a context proxy to authenticate user-mode processes for permission to use a non-secure device interface (instead of, e.g., using the context proxy for every communication between the user-mode processes and an underlying device), the systems and methods described herein may allow trusted user-mode processes to safely access a device while reducing the avoidable overhead of including the context proxy in every transaction.

Figure 6:
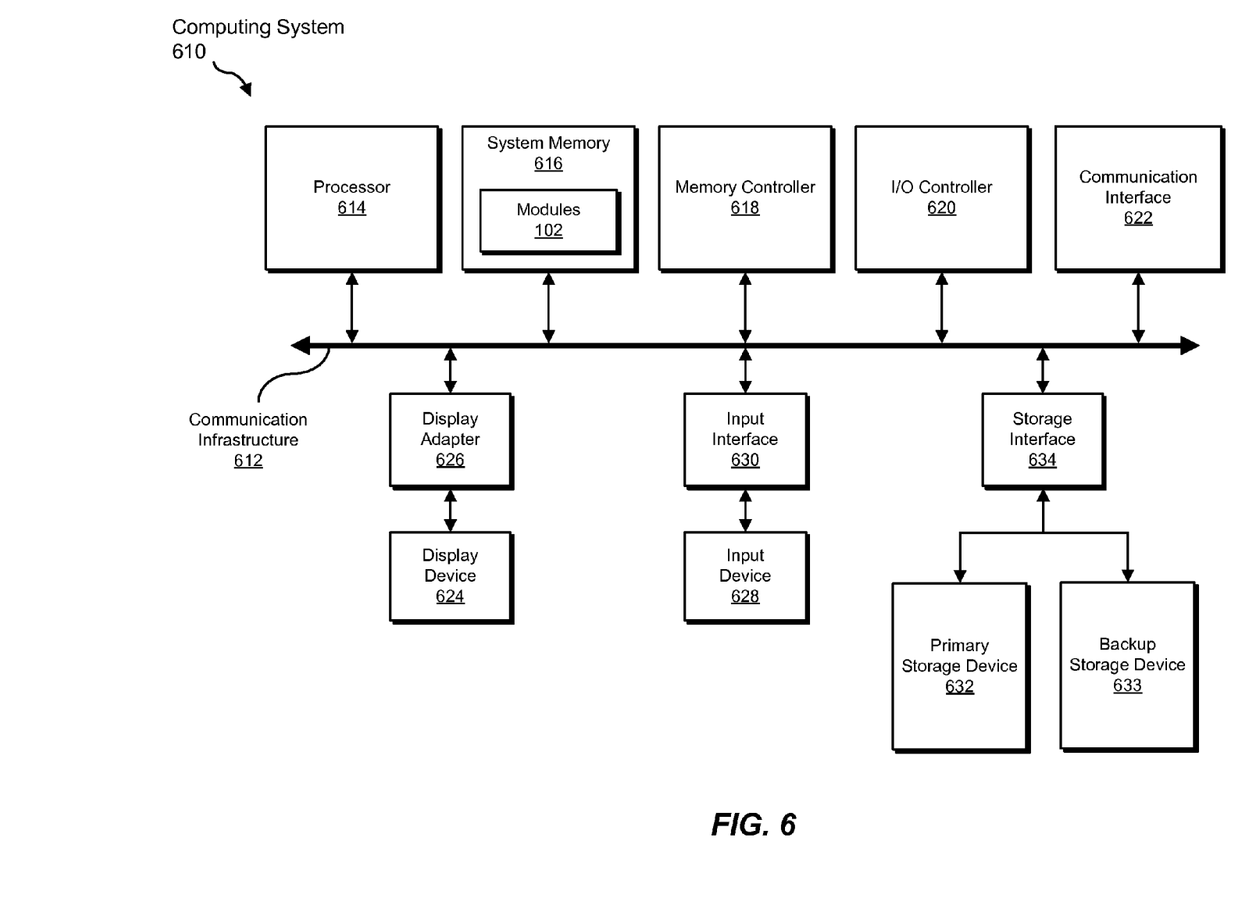
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, receiving, adding, determining, removing, allowing, sending, accessing, and/or opening steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, receiving, adding, determining, removing, allowing, sending, accessing, and/or opening.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, receiving, adding, determining, removing, allowing, sending, accessing, and/or opening steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, receiving, adding, determining, removing, allowing, sending, accessing, and/or opening steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, receiving, adding, determining, removing, allowing, sending, accessing, and/or opening steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, receiving, adding, determining, removing, allowing, sending, accessing, and/or opening steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
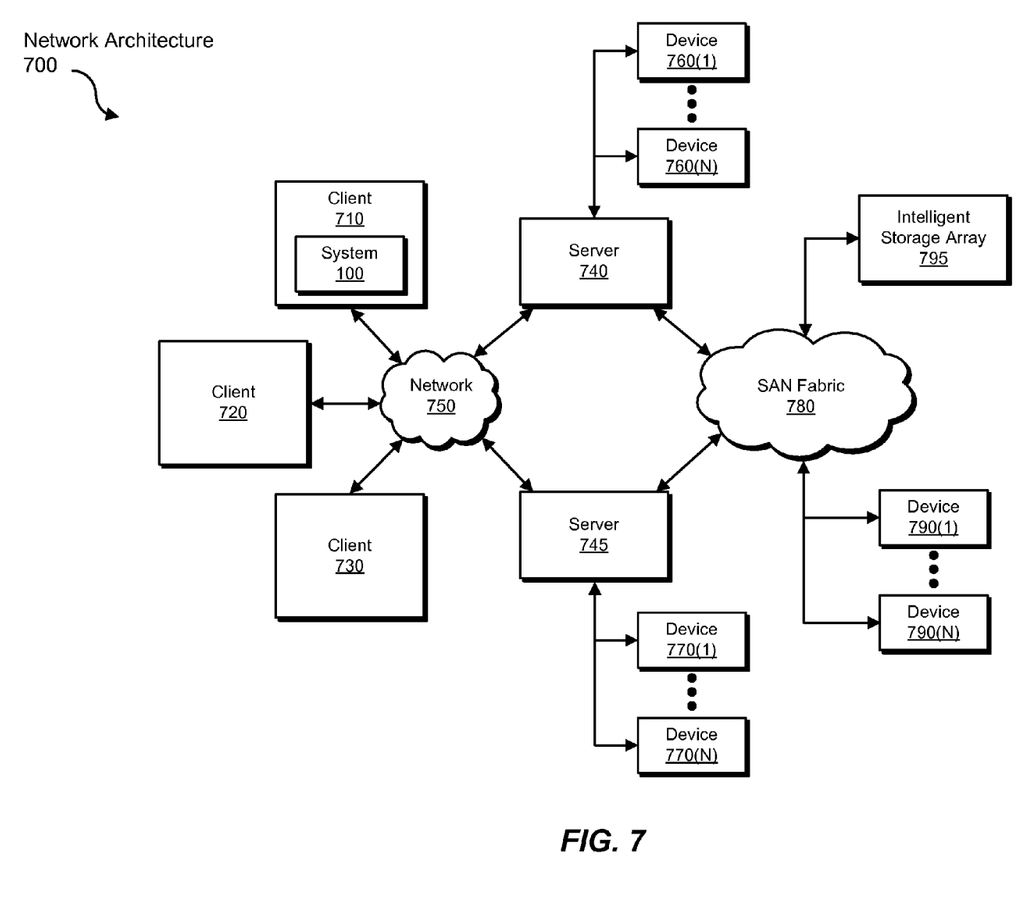
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, receiving, adding, determining, removing, allowing, sending, accessing, and/or opening steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for securing access to kernel devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a computing system for securing access to kernel devices. As another example, one or more of the modules described herein may transform a device into a secure device accessible from various process contexts without a proxy.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing access to kernel devices, at least a portion of the method being performed by a computing device comprising at least one processor, the method comprising:
    identifying a context proxy privileged to access a secure device interface for a device;
    receiving a request from the context proxy to allow a user-mode process to access a non-secure device interface for the device;
    adding an identifier of the user-mode process to a list of authenticated processes in response to the request from the context proxy;
    receiving a request from the user-mode process to access the non-secure device interface;
    determining, in response to the request from the user-mode process, that the list of authenticated processes includes the identifier of the user-mode process;
    allowing the user-mode process to access the non-secure device interface directly based on the determination that the list of authenticated processes includes the identifier of the user-mode process.

2. The computer-implemented method of claim 1, wherein receiving the request from the context proxy comprises receiving the request from the context proxy via the secure device interface.

3. The computer-implemented method of claim 1, wherein a device driver interfaces with both the secure device interface and the non-secure device interface.

4. The computer-implemented method of claim 1, wherein the non-secure device interface comprises a non-secure device file.

5. The computer-implemented method of claim 4, wherein allowing the user-mode process to access the non-secure device interface directly comprises allowing the user-mode process to open the non-secure device file.

6. The computer-implemented method of claim 1, further comprising:
    determining that the user-mode process has terminated;
    removing the identifier of the user-mode process from the list of authenticated processes.

7. A computer-implemented method for securing access to kernel devices, at least a portion of the method being performed by a computing device comprising at least one processor, the method comprising:
    identifying a context proxy privileged to access a secure device interface for a device;
    sending a request from a user-mode process to the context proxy for access to a non-secure device interface for the device;
    accessing the device directly via the non-secure device interface, wherein at least one module associated with the device allows the user-mode process to access the device directly via the non-secure device interface in response to determining that a list of authenticated processes includes an identifier of the user-mode process that was added to the list of authenticated processes in response to receiving a request from the context proxy to allow the user-mode process to access the non-secure device interface for the device.

8. The computer-implemented method of claim 7, wherein a device driver interfaces with both the secure device interface and the non-secure device interface.

9. The computer-implemented method of claim 7, wherein the non-secure device interface comprises a non-secure device file.

10. The computer-implemented method of claim 9, wherein accessing the device directly via the non-secure device interface comprises opening the non-secure device file.

11. The computer-implemented method of claim 7, wherein sending the request to the context proxy comprises sending a secured communication to the context proxy.

12. A system for securing access to kernel devices, the system comprising:
an identification module programmed to identify a context proxy privileged to access a secure device interface for a device;
an authentication module programmed to:
receive a request from the context proxy to allow a user-mode process to access a non-secure device interface for the device;
add an identifier of the user-mode process to a list of authenticated processes in response to the request from the context proxy;
a decision module programmed to:
receive a request from the user-mode process to access the non-secure device interface;
determine, in response to the request from the user-mode process, that the list of authenticated processes includes the identifier of the user-mode process;
an allowance module programmed to allow the user-mode process to access the non-secure device interface directly based on the determination that the list of authenticated processes includes the identifier of the user-mode process;
at least one hardware processor configured to execute the identification module, the authentication module, the decision module, and the allowance module.

13. The system of claim 12, wherein the authentication module is programmed to receive the request from the context proxy by receiving the request from the context proxy via the secure device interface.

14. The system of claim 12, wherein a device driver interfaces with both the secure device interface and the non-secure device interface.

15. The system of claim 12, wherein the non-secure device interface comprises a non-secure device file.

16. The system of claim 15, wherein the allowance module is programmed to allow the user-mode process to access the non-secure device interface directly by allowing the user-mode process to open the non-secure device file.

17. The method of claim 1, wherein the context proxy acts on behalf of the user-mode process to perform at least one function that the user-mode process cannot perform on its own.

18. The method of claim 17, wherein the function that the user-mode process cannot perform on its own comprises executing in at least one of:
a kernel mode;
an inner protection ring.

19. The method of claim 1, wherein the identifier of the user-mode process comprises a number capable of uniquely identifying the user-mode process among all current processes.

20. The method of claim 1, further comprising granting subsequent requests from the user-mode process to access the non-secure device interface directly without requiring the user-mode process to send additional requests to the context proxy for access to the non-secure device interface for the device.

* * * * *